(12) United States Patent
Boddy et al.

(10) Patent No.: US 8,171,721 B2
(45) Date of Patent: May 8, 2012

(54) CLOSED LOOP CONTROL OF EXHAUST SYSTEM FLUID DOSING

(75) Inventors: Douglas Ernst Boddy, Orion, MI (US); Mark Louis Dell'Eva, Grand Blanc, MI (US); Eric O. Barrows, Richmond, MI (US); James Edward McCarthy, Jr., Canton, MI (US); John Robert Barla, Macomb Township, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 1464 days.

(21) Appl. No.: 11/656,194

(22) Filed: Jan. 22, 2007

(65) Prior Publication Data

US 2008/0245058 A1 Oct. 9, 2008

(51) Int. Cl.
*F01N 3/00* (2006.01)

(52) U.S. Cl. ........... 60/286; 60/274; 60/295; 60/301; 60/303

(58) Field of Classification Search .......... 60/274, 60/277, 286, 295, 301, 303, 324
See application file for complete search history.

(56) References Cited

U.S. PATENT DOCUMENTS

| | | |
|---|---|---|
| 5,605,042 A | 2/1997 | Stutzenberger |
| 5,606,856 A | 3/1997 | Linder et al. |
| 5,636,653 A | 6/1997 | Titus |
| 5,771,689 A | 6/1998 | Bareis et al. |
| 5,823,443 A | 10/1998 | Cooper et al. |
| 6,006,515 A | 12/1999 | Wakamoto |
| 6,021,639 A * | 2/2000 | Abe et al. .......... 60/297 |
| 6,167,698 B1 * | 1/2001 | King et al. .......... 60/286 |
| 6,192,677 B1 | 2/2001 | Tost |
| 6,273,120 B1 * | 8/2001 | Hofmann et al. ........ 137/98 |
| 6,279,603 B1 | 8/2001 | Czarbik et al. |
| 6,481,641 B1 | 11/2002 | Mieney |
| 6,519,935 B2 * | 2/2003 | Weigl .......... 60/286 |
| 6,732,507 B1 | 5/2004 | Stanglmaier et al. |

(Continued)

FOREIGN PATENT DOCUMENTS

DE 102004062208 A1 7/2006

(Continued)

OTHER PUBLICATIONS

International Search Report with Written Opinion of the International Searching Authority for PCT/IB2007/000113, claiming priority from the present application.

*Primary Examiner* — Binh Q Tran
(74) *Attorney, Agent, or Firm* — Paul V. Keller

(57) ABSTRACT

An exhaust line fuel injection system and associated methods of operation and control are disclosed. The fuel passes through a regulating valve connected to a pressurized fuel source and an outlet connected to an exhaust system fuel supply line. The exhaust system fuel supply line is connected to a nozzle, which generally comprises a check-valve and is configured to inject the fuel into the exhaust line. Using a pressure measuring device, an indication of the exhaust system fuel supply line pressure is obtained. A controller provides control over the flow regulating valve using feedback from the pressure indication and a predetermined relationship between the flow rate through the nozzle and one of the exhaust system fuel supply line pressure and the pressure drop across the nozzle. The method can be implemented with a single pressure measuring device. The same pressure measurements, especially their frequency spectrum, can be used to detect system faults.

35 Claims, 5 Drawing Sheets

U.S. PATENT DOCUMENTS

| | | |
|---|---|---|
| 6,912,846 B2 | 7/2005 | Huber et al. |
| 6,935,103 B2* | 8/2005 | Binder et al. .................... 60/286 |
| 6,955,042 B1* | 10/2005 | Wnuck et al. .................... 60/286 |
| 7,063,642 B1* | 6/2006 | Hu et al. ........................ 477/100 |
| 7,082,753 B2 | 8/2006 | Dalla betta et al. |
| 7,292,945 B2* | 11/2007 | Wargo et al. .................... 702/50 |
| 7,617,674 B2* | 11/2009 | Gerlach .......................... 60/286 |
| 2004/0124259 A1 | 7/2004 | Guezennec et al. |
| 2005/0235632 A1 | 10/2005 | Tarabulski et al. |
| 2005/0247051 A1 | 11/2005 | Wagner et al. |
| 2009/0025373 A1* | 1/2009 | Buerglin et al. ................ 60/287 |
| 2009/0159132 A1* | 6/2009 | Gerlach .......................... 137/2 |

FOREIGN PATENT DOCUMENTS

| | | |
|---|---|---|
| DE | 102005041660 A1 | 3/2007 |
| EP | 1176295 A | 1/2002 |
| FR | 2879241 A | 6/2006 |

* cited by examiner

CLOSED LOOP CONTROL OF EXHAUST SYSTEM FLUID DOSING

FIELD OF THE INVENTION

The present invention relates to exhaust aftertreatment systems for diesel engines and lean-burn gasoline engines.

BACKGROUND $NO_x$ and particulate matter (soot) emissions from diesel engines are an environmental problem. Several countries, including the United States, have long had regulations pending that will limit these emissions. Manufacturers and researchers have put considerable effort toward meeting those regulations. Diesel particulate filters (DPFs) have been proposed for controlling the particulate matter emissions. A number of different solutions have been proposed for controlling the NOx emissions.

In gasoline-powered vehicles that use stoichiometric fuel-air mixtures, $NO_x$ emissions can be controlled using three-way catalysts. In diesel-powered vehicles, which use compression ignition, the exhaust is generally too oxygen-rich for three-way catalysts to be effective.

One set of approaches for controlling NOx emissions from diesel-powered vehicles involves limiting the creation of pollutants. Techniques such as exhaust gas recirculation and partially homogenizing fuel-air mixtures are helpful in reducing NOx emissions, but these techniques alone are not sufficient. Another set of approaches involves removing NOx from the vehicle exhaust. These approaches include the use of lean-burn $NO_X$ catalysts, selective catalytic reduction (SCR), and lean $NO_X$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. A reductant such as diesel fuel must be provided, which introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometimes ambiguous nomenclature, one should note that in the exhaust aftertreatment art the terms "SCR catalyst" and "lean NOx catalyst" can be used interchangeably. Often, however, the term "SCR" is used to refer just to ammonia-SCR, in spite of the fact that strictly speaking ammonia-SCR is only one type of SCR/lean NOx catalysis. Commonly, when both ammonia-SCR catalysts and lean NOx catalysts are discussed in one reference, SCR is used in reference to ammonia-SCR and lean NOx catalysis is used in reference to SCR with reductants other than ammonia, such as SCR with hydrocarbons.

LNTs are devices that adsorb NOx under lean exhaust conditions and reduce and release the adsorbed NOx under rich exhaust conditions. An LNT generally includes a NOx adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time to time to remove accumulated NOx and thereby regenerate (denitrate) the LNT.

During denitration, much of the adsorbed NOx is reduced to $N_2$, although a portion of the adsorbed NOx is released without having been reduced and another portion of the adsorbed NOx is released after being deeply reduced to ammonia. U.S. Pat. No. 6,732,507 describes a system in which an SCR catalyst is configured downstream from the LNT in order to utilize the ammonia released during denitration. The ammonia is utilized to reduce NOx slipping past the LNT and thereby improves conversion efficiency over a stand-alone LNT.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine. At least in the case of a diesel engine, however, it is often necessary to provide additional heat. Once the LNT is sufficiently heated, then a reducing environment similar to LNT denitration is created.

Except when the engine can be run stoichiometric, or rich, creating a reducing environment for LNT regeneration generally involves injecting reductant into the exhaust. A portion of the reductant is required to eliminate excess oxygen from the exhaust. The amount of oxygen to be removed by reaction with reductant can be reduced in various ways, for example, by throttling the engine air intake. At least in the case of a diesel engine, however, it is generally necessary to eliminate a substantial amount of oxygen from the exhaust by combustion or reforming reactions with injected reductant. Reductant is also commonly injected into the exhaust to heat the LNT for desulfation or to heat a DPF to initiate soot combustion.

Reductant can be injected into the exhaust by the engine fuel injectors. For example, the engine can inject extra fuel into the exhaust within one or more cylinders prior to expelling the exhaust. A disadvantage of this approach is that engine oil can be diluted by fuel passing around piston rings and entering the oil gallery. Additional disadvantages of cylinder reductant injection include having to alter the operation of the engine to support LNT regeneration, excessive dispersion of pulses of reductant, and forming deposits on turbocharger and EGR valves. As an alternative to using the engine fuel injectors, reductant can be injected into the exhaust downstream from the engine using separate exhaust line fuel injectors. Injecting the exhaust directly into the exhaust line has the advantage of allowing the point of introduction to be selected.

An oxidation catalyst or a fuel reformer may be used within the exhaust line to combust or reform the injected reductant upstream from a pollution control device. U.S. Pat. No. 7,082,753 (hereinafter "the '753 patent") describes an exhaust aftertreatment system with a fuel reformer placed in the exhaust line upstream from an LNT. The reformer includes both oxidation and reforming catalysts. The reformer both removes excess oxygen from the exhaust and converts the diesel fuel reductant into more reactive reformate. The inline reformer of the '753 patent is designed to heat rapidly and to then catalyze steam reforming.

Temperatures from about 500 to about 700° C. are required for steam reforming. These temperatures are substantially higher than typical diesel exhaust temperatures. To achieve a sufficient reformer temperature when LNT regeneration is required, the reformer of the '753 patent is heated by first injecting fuel at a rate that leaves the exhaust lean, whereby the injected fuel combusts in the reformer, releasing heat. After warm up, the fuel injection rate is increased to provide a rich exhaust. Ideally, the reformer of the '753 patent can be operated auto-thermally, with endothermic steam reforming reactions balancing exothermic combustion reaction. In practice, however, at high exhaust oxygen concentrations the reformer unavoidably and excessively heats if reformate is produced continuously. To avoid overheating, the '753 patent proposes pulsing the fuel injection.

U.S. Pat. No. 6,006,515 suggests that an LNT may be regenerated more efficiently by either longer or shorter chain hydrocarbons, depending on the LNT composition and the temperature at which regeneration takes place. In order to be able to control the selection between long and short chain hydrocarbons, the patent proposes two fuel injectors, one in the exhaust manifold upstream from the turbocharger and one in the exhaust line immediately before the LNT. Due to the high temperatures in the exhaust upstream from the turbocharger, fuel injected with the manifold fuel injector is said to undergo substantial cracking to form shorter chain hydrocarbons.

Diesel particulate filters must also be regenerated. Regeneration of a DPF is to remove accumulated soot. Two general approaches are continuous and intermittent regeneration. In continuous regeneration, a catalyst is provided upstream of the DPF to convert NO to $NO_2$. $NO_2$ can oxidize soot at typical diesel exhaust temperatures and thereby effectuate continuous regeneration. A disadvantage of this approach is that it requires a large amount of expensive catalyst.

Intermittent regeneration involves heating the DPF to a temperature at which soot combustion is self-sustaining in a lean environment. Typically this is a temperature from about 400 to about 700° C., depending in part on what type of catalyst coating has been applied to the DPF to lower the soot ignition temperature. A typical way to achieve soot combustion temperatures is to inject fuel into the exhaust upstream from the DPF, whereby the fuel combusts generating heat in the DPF or an upstream device.

Various exhaust line reductant injection systems for injecting diesel fuel for LNT regeneration have been proposed. A common issue addressed by these systems concerns the heat of the exhaust line. Heat from the exhaust line can cause fuel that remains stagnant within the fuel injectors between fuel injections to decompose into substances that eventually clog the fuel injectors.

One approach is to physically separate the injector from the exhaust line by providing a relatively long line between the injector and a point of entry into the exhaust line. A difficulty with this approach is that the injector is generally designed to provide the fuel in finely distributed droplets. These droplets may recombine within the relatively long line before reaching the point of entry.

Another approach is to design exhaust line fuel injectors with cooling jackets. Water or air cooling can be used. Alternatively, an injector can be cooled with the reductant being injected; an excess flow of reductant is provided to the injector. The excess flow is returned to a reservoir. The return flow carries away heat.

Robert Bosch GmbH has proposed an exhaust line fuel injection system with a separate metering valve and injection unit. The injection unit is a simple nozzle surrounded by a cooling jacket. The metering valve, which comprises a pulse width modulated (PWM) pulse width modulated valve, is kept some distance away from the exhaust line to protect temperature sensitive components of the valve, such as electrical insulators. The metering valve is designed to draw fuel from the low pressure portion of the engine fuel injection circuit or from a separate pump and/or pressure regulator. The flow rate is regulated through the duty cycle of the metering valve.

The Bosch system is configured with two pressure measuring devices, one upstream from the PWM valve and the other downstream from the PWM valve. A conventional way to control the flow through this system would be to relate the pressure drop across the metering valve together with the duty cycle of the valve to the flow rate. The duty cycle (the fraction of time the valve is open) can be increased or decreased until the desired flow rate is reached.

In spite of advances, a long felt need continues for an exhaust aftertreatment system that is durable, is reliable, has acceptable manufacturing and operating costs, and can reduce NOx emissions from diesel engines enough to meet U.S. Environmental Protection Agency (EPA) regulations effective in 2010 and other such regulations.

SUMMARY

One of the inventors' concepts relates to a method of operating an exhaust aftertreatment system with exhaust line fuel injection. The method comprises opening a flow regulating valve to allow fuel to flow from a pressurized fuel source to an exhaust system fuel supply line. The exhaust system fuel supply line is connected to a nozzle. The nozzle generally comprises a check valve, whereby the nozzle sprays the fuel into the exhaust line whenever the pressure drop across the nozzle is sufficiently high to open the check valve. Using a pressure measuring device, an indication of the exhaust system fuel supply line pressure is obtained. The indication of the exhaust system fuel supply line pressure is used to provide feedback for controlling the regulating valve.

The method uses a predetermined relationship between the flow rate through the nozzle and either the indication of the exhaust system fuel supply line pressure or a difference between the indication of the exhaust system fuel supply line pressure and an exhaust line pressure. The relationship can be used to relate pressures or pressure drops to flow rates, in which case the valve is controlled to cause the flow rate to approach a flow rate target. Equivalently, the predetermined relationship can be used to obtain a target pressure indication from the target flow rate (and optionally the exhaust line pressure), in which case the valve is controlled to cause the pressure indications to approach the target.

One advantage of this method is that it can be implemented with a single pressure measuring device. Another advantage is that it provides accurate control, particularly where the exhaust line pressure does not vary much. A further advantage is that the same pressure indication used for control can provide useful diagnostic information. In particular, it has been found that the frequency spectrum of the pressure indication can signify that the fuel injection system is functioning properly.

The flow rate is related to either the pressure drop across the nozzle or an exhaust system fuel supply line pressure independent of any other system pressure. Although the pressure drop can be used even when the exhaust line does not include a DPF, using the pressure drop is particularly desirable and convenient to implement when the exhaust line has a DPF. Pressure variations in the exhaust line tend to be higher when the exhaust line contains a DPF, with pressures increasing as the DPF fills. The exhaust line pressure is typically measured for DPF control. The pressure drop across the nozzle is the difference between the pressure in the exhaust system fuel supply line and the exhaust line. The pressure drop can track the flow rate even more accurately than the exhaust system fuel supply line pressure.

Another aspect of the inventors' concepts relates to a power generation system. The power generation system has an engine operative to produce an exhaust, which is channeled through an exhaust line. The power generation system also has a fuel pump operative to pump fuel from a fuel tank to a conduit, a flow regulating valve configured to admit fuel from the conduit and to release the fuel to an exhaust system fuel supply line, a nozzle, which generally comprises a check-valve and is configured to admit fuel from the exhaust system fuel supply line to the exhaust line, a pressure measuring device configured to measure a pressure of the exhaust system fuel supply line, and a controller configured to control the flow regulating valve using feedback from the measured pressures. In one embodiment, the controller is configured to use a predetermined relationship between the flow rate through the nozzle and the pressure in the exhaust system fuel supply line. In another embodiment, the controller is configured to use a predetermined relationship between the flow rate through the nozzle and a pressure drop across the nozzle. The system can be used to implement the methods described above.

Another one of the inventors' concepts relates to a method of dosing fuel to an exhaust aftertreatment system. According to the method, the fuel is passed through a regulating valve to an exhaust system fuel supply line. From there, the fuel is injected into an exhaust line through a nozzle, which generally comprises a check-valve. A pressure in the exhaust system fuel supply line is measured to obtain pressure data. A relationship is provided giving the flow rate through the check-valve as a function of the exhaust system fuel supply line pressure, or the pressure drop across the check-valve. An integration using the pressure data and the relationship is carried out to obtain a total amount of fuel passing through the check-valve over a period. The fuel dosing can be controlled based on the total. For example, an injection can be terminated when a certain total amount of fuel has been injected. When fuel injection is being pulsed, a pulse period, frequency, or amplitude can be adjusted based on the total.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description and the accompanying drawings. The specifics disclosed herein may be generalized, narrowed, and combined in various ways with the ultimate statement of what the inventors claim as their invention being reserved for the claims that follow.

DETAILED DESCRIPTION

Figure 1:
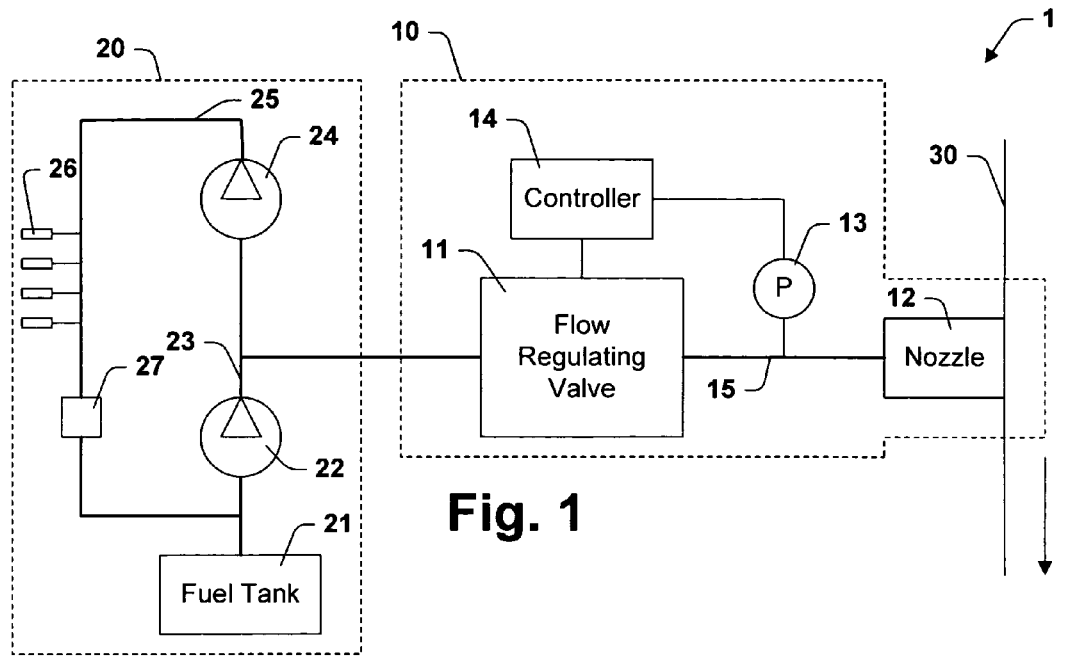
FIG. 1 is a schematic illustration of an exemplary exhaust line hydrocarbon injection system.

FIG. 1 is a schematic illustration of an exemplary exhaust line hydrocarbon injection system 10 that is part of a power generation system 1 that can embody some of the inventors' concepts. The hydrocarbon injection system 10 draws fuel from an engine fuel supply system 20 and injects the fuel into an exhaust line 30. The hydrocarbon injection system 10 includes a flow regulating valve 11, a nozzle 12, a pressure sensor 13, and a controller 14. The pressure sensor 13 is configured to read the pressure in an exhaust system fuel supply line 15, which carries fuel from the flow regulating valve 11 to the nozzle 12.

The flow regulating valve 11 is adapted to selectively admit fluid from a pressurized source. In this example, the pressurized source is the low pressure portion of the engine fuel supply system 20. The engine fuel supply system 20 has a low pressure fuel pump 22 that pumps fuel from a tank 21 to a conduit 23. The conduit 23 connects to a high pressure fuel pump 24, which supplies a high pressure common rail 25. Fuel injectors 26 admit fuel from the common rail 25 to the cylinders of a diesel engine (not shown), which is operative to produce the exhaust carried by the exhaust line 30. A high pressure relief valve 27 can return fuel from the common rail 27 to the fuel tank 21.

In this example, the flow regulating valve 11 is configured to selectively admit fuel from the conduit 23. Drawing fuel for exhaust line fuel injection from the conduit 23 has the advantage of eliminating the need for an additional fuel pump separate from the engine fuel supply system 20, but has the disadvantage that the pressure in the conduit 23 varies significantly during normal operation of the engine.

The fuel enters the exhaust line 30 through the nozzle 12. A nozzle can be any structure that provides a narrow passage for the fuel it passes. In the present context, the passage is narrow in the sense of causing the fuel to undergo a large pressure drop in comparison to the pressure drop caused by the exhaust system fuel supply line 15. The nozzle 12 comprises a check valve, whereby fuel only flows through the nozzle 12 if the pressure drop across the nozzle exceeds a critical value. The critical value is preferably from about 0.5 to about 3 atmospheres, more preferably from about 1 to about 2 atmospheres. Typically the pressure drop is approximately equal to the gauge pressure of the exhaust system fuel supply line 15, as the pressure in the exhaust line 30 generally remains close to atmospheric pressure.

Figure 2:
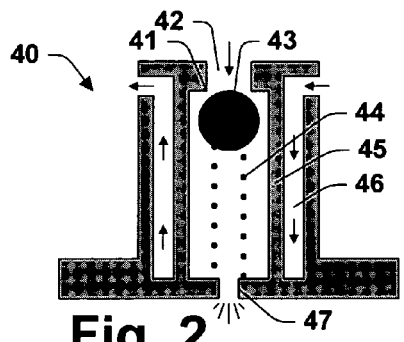
FIG. 2 is a schematic illustration of an example of a nozzle in an open position.
Figure 3:
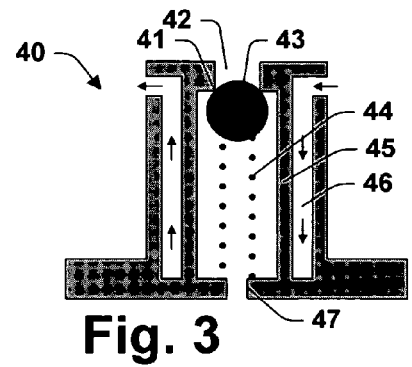
FIG. 3 is a schematic illustration of the exemplary nozzle of FIG. 2 in a closed position.

FIGS. 2 and 3 illustrate an exemplary nozzle 40, which can be used as the nozzle 12. The nozzle 40 comprises a poppet 43 biased against a valve seat 41 by a spring 44. When the pressure drop across the nozzle 40 exceeds a critical amount, the poppet 43 lifts off the seat 41 as shown in FIG. 2, allowing fuel to flow from the inlet 42 through the valve body 45 and to exit as a spray though the orifice 47. When the pressure drop across the nozzle 40 falls below the critical value, the poppet 43 collapses against the seat 41 blocking the flow as shown in FIG. 3. The pressure drop across the nozzle 40 is preferably primarily a pressure drop across the opening between the poppet 43 and the seat 41.

The nozzle 12 is designed for intermittent hydrocarbon injection into the exhaust line 30. Accordingly, the nozzle 12 must generally be cooled to prevent fuel remaining in the nozzle 12 between fuel injections from being heated by the exhaust. If the nozzle 12 is allowed to heat between fuel injections, stagnant fuel within the nozzle 12 can decompose and eventually clog the fuel injector. To prevent the stagnant fuel from being excessively heated, the nozzle 40 is provided with a cooling jacket 46 through which a cooling fluid, such as engine coolant or air, can be circulated.

Figure 4:
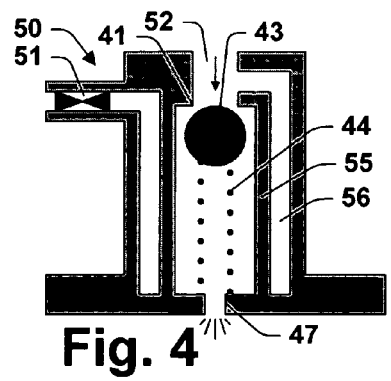
FIG. 4 is a schematic illustration of another example of a nozzle in an open position.
Figure 5:
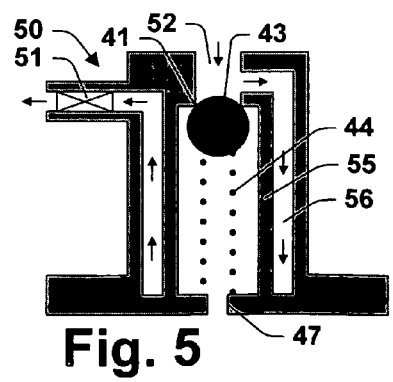
FIG. 5 is a schematic illustration of the exemplary nozzle of FIG. 4 in a closed position.

As an alternative, the nozzle 12 can be cooled using an excess fuel flow. An excess fuel flow is fuel supplied to a nozzle, but not injected through the nozzle 12. Rather, the excess fuel is carried away from the nozzle 12 taking with it heat. FIGS. 4 and 5 illustrate a nozzle 50 configured for cooling by an excess fuel flow. The nozzle 50 has many of the same components as the nozzle 40. The inlet 52 has an opening to cooling jacket 56. When fuel injection is not required, a valve 51 is opened allowing fuel to flow from the inlet 52 through the cooling jacket 56, cooling the valve body 55 as illustrated in FIG. 5. When fuel injection is required, the valve 51 is closed, whereby fuel flows through the valve body 55, as illustrated in FIG. 4, provided that the fuel supply is at sufficient pressure to lift the poppet 43 off its seat 41. When the valve 51 is again opened, the fuel flow through the cooling jacket 56 relieves pressure from the inlet 52, causing the poppet 43 to return to its seat 41, and preventing fuel flow through the valve body 55 as illustrated in FIG. 5.

Figure 6:
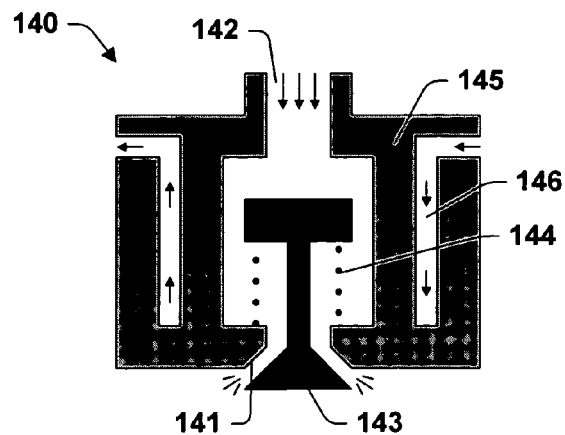
FIG. 6 is a schematic illustration of a further example of a nozzle in an open position.
Figure 7:
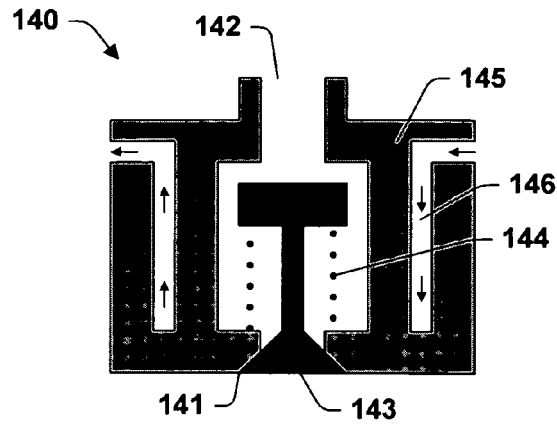
FIG. 7 is a schematic illustration of the exemplary nozzle of FIG. 6 in a closed position.

FIGS. 6 and 7 schematically illustrate another exemplary nozzle 140. The nozzle 140 comprises a poppet 143 biased against a seat 141 by a spring 144. When the pressure from the inlet 142 is sufficiently great, the poppet 143 lifts off the seat 141 and fuel flow through the nozzle body 145 as illustrated in FIG. 6. When the pressure drops, the poppet 143 closes with the seat 141 and the fuel flow is stopped. The nozzle 141 is configured for cooling by circulation of a coolant through passages 146. If a nozzle is not configured for cooling, it is preferably configured to be purged with air between fuel injections. An air purge can remove fuel from the nozzle, which fuel might otherwise form nozzle-clogging substances between fuel injections. In one example, purge air is drawn from a truck braking system.

The flow regulating valve 11 can be of any suitable type. Examples of suitable valve types include proportional control valves and pulse width modulated (PWM) valves. A proportional flow control valve is a valve that regulates the volume of flow through a degree of opening. A PWM valve is a valve that regulates flow by rapidly opening and closing, with the volume of flow through the valve being regulated by the fraction of time the valve is open (the duty cycle). A PWM valve comprises an actuator. Examples of actuators include solenoids and hydraulic actuators.

Figure 8:
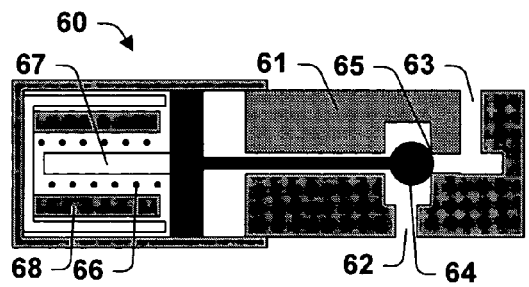
FIG. 8 is a schematic illustration of an example of a two-way PWM pulse width modulated valve in a closed position.
Figure 9:
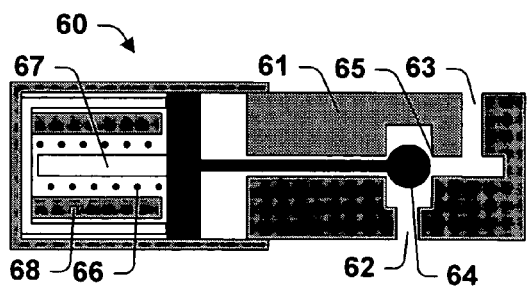
FIG. 9 is a schematic illustration of the exemplary nozzle of FIG. 8 in an open position.

FIGS. 8 and 9 are schematic illustrations of an exemplary two port PWM pulse width modulated solenoid valve 60 that can be used as the flow regulating valve 11. The valve 60 comprises a valve body 61 defining an inlet 62 and an outlet 63. In a closed position, illustrated by FIG. 8, a poppet 64 rests against a seat 65 blocking flow through the valve body 61 between the inlet 62 and the outlet 63. A solenoid is energized to lift the poppet 64 off its seat 65 as illustrates in FIG. 9. The valve 60 comprises a spring 66 that biases the poppet 64 against the valve seat 65 and an armature 67 that lifts the poppet 64 off the valve seat 65 when the coil 68 is energized. The poppet 64 and seat 65 are configured whereby the pressure of the supply fluid within the valve body 61 biases the poppet 64 against the seat 65 when the coil 68 is not energized.

Figure 10:
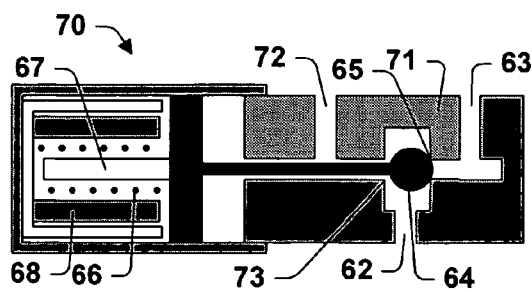
FIG. 10 is a schematic illustration of an example of a three-way PWM pulse width modulated valve in a closed position.
Figure 11:
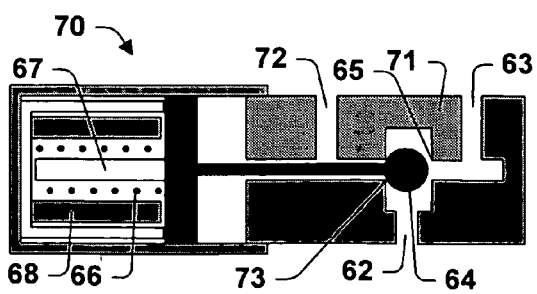
FIG. 11 is a schematic illustration of the exemplary nozzle of FIG. 10 in an open position.

FIGS. 10 and 11 illustrate an exemplary three port PWM valve 70 that can also be used as the flow regulating valve 11. The valve 70 comprises many of the same components as the valve 60. A principal difference is that when the valve 70 is in the closed position illustrated by FIG. 10, fluid from the entrance 62 flows through the valve body 71 to a return port 72. When the valve 70 is in an open position illustrated by FIG. 11, the poppet 64 rests against a second seat 73 blocking the flow between the entrance 62 and the return port 72.

Figure 12:
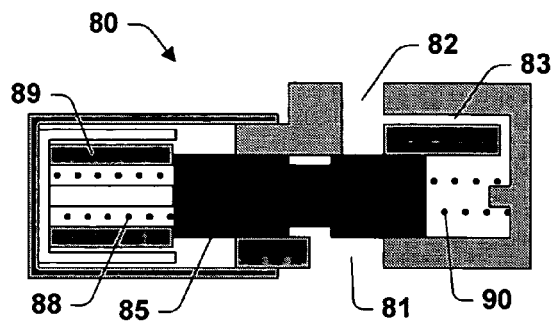
FIG. 12 is a schematic illustration of an example of a proportional control spool valve in a closed position.
Figure 13:
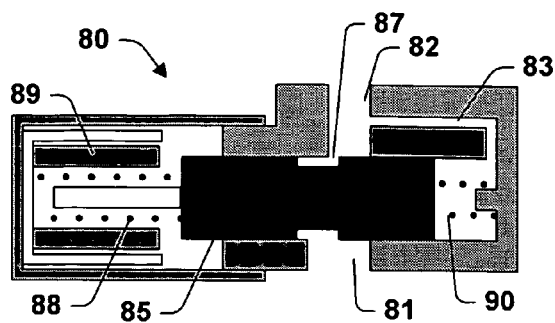
FIG. 13 is a schematic illustration of the valve of FIG. 12 in an open position.

FIGS. 12 and 13 illustrate an exemplary spool valve 80, which is one type of proportional control valve that can be used as the flow regulating valve 11. The spool valve 80 can be cylindrically symmetrical except for the entrance port 81, the exit port 82, and the control passage 83. The valve 80 comprises a valve body 84 within which a spool 85 slides. The axial position of the spool 85 within the valve body 86 determines a degree of opening of a passage 87, which is a bottleneck for flow between the entrance port 81 and the exit port 82. FIG. 12 shows the valve 80 in a fully closed position and FIG. 13 shows the valve 80 in a partially open position. The exit port 82 is in fluid communication with a chamber 88 through the control passage 83.

During operation, the spool 85 moves to an equilibrium position in which the various forces acting upon the spool 85 are in balance. A solenoid 89 and a spring 90 exert axial forces on the spool 85. The fluid in the chamber 88 also exerts an axial on the spool 85. In the equilibrium position, the pressure force from the chamber 88, the spring force from the spring 90, and the force from the solenoid 89 balance. Preferably, the forces from the spring 90 and the solenoid 89 are made largely independent of the axial position of the spool 89. The valve 80 provides a steady pressure at the exit port 82 that depends predictably on the power provided to the solenoid 89.

Figure 14:
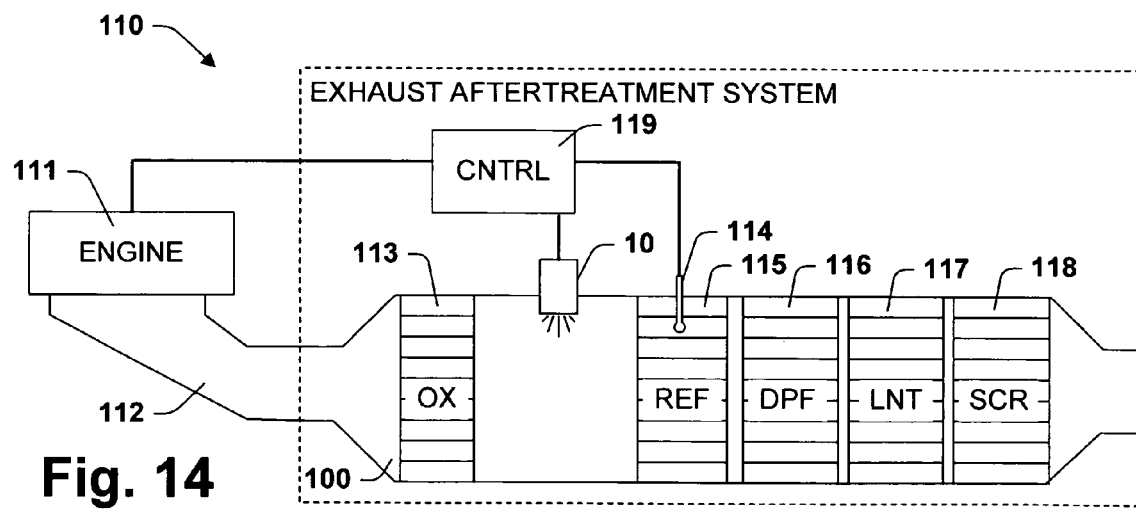
FIG. 14 is a schematic illustration of an exemplary power generation system.

Configured within the exhaust line 30 are one or more pollution control devices. FIG. 14 provides a schematic illustration of an exemplary power generation system 110 comprising an exhaust line 100, which can be the exhaust line 30.

The power generation system 110 includes an engine 111, a manifold 112 that guides exhaust from the engine 111 to the exhaust line 100, and a controller 119 that controls the fuel injection system 10 based on data such as data from the temperature sensor 114. The controller 119 can be the same unit as the controller 14 or a separate unit that issues instructions to the controller 14. Likewise, the controller 119 can be an engine control unit (ECU) or a separate device that communicates with the ECU.

The exemplary exhaust line 100 includes an oxidation catalyst 113, a fuel reformer 115, a diesel particulate filter 116, an LNT 117, and an SCR catalyst 118. The fuel injection system 10 is used intermittently to warm the fuel reformer 115, to heat the DPF 116, and to provide fuel for the fuel reformer 115 for removing oxygen from the exhaust and producing reformate to regenerate the LNT 117. The fuel injection system 10 may also be used to provide fuel in pulses over an extended period of time, as when fuel injection is pulsed to regulate the temperature of the reformer 115 over extended periods of desulfating the LNT 117.

A fuel injection system 10 is typically designed to accurately dose fuel to the exhaust line 30 over a broad range of rates in order to fulfill one or more of the foregoing function. A broad range typically spans two orders of magnitude. For heavy duty diesel engines, exemplary ranges are from about 20 to about 1200 grams per minute and from about 40 to about 1200 grams. For a medium duty diesel engine, from about 20 to about 800 grams per minute is typical. For an automotive engine, from about 20 to about 400 grams per minute is typical. Relatively low fuel injection rates are used to heat the reformer 114 and downstream devices. Relatively high fuel injection rates are used to make the exhaust rich for LNT regeneration. The accuracy of fuel injection rate control is preferably to within about ±5% of the full scale over the entire range, more preferably to within about ±3%, ad even more preferably to within about ±1%.

The fuel injection system 10 preferably remains operative as the exhaust pipe temperature varies from about 110° C. to about 550° C. Optionally, the fuel injection system 10 is configured to inject fuel into the exhaust manifold 112 of the engine 111. In such a case, the fuel injection system is preferably operative up to exhaust pipe temperatures of about 600° C. Operability at these temperatures includes the property of the fuel injection system not being adversely affected over the extended periods between fuel injections during which the nozzle 12 remains idle.

In order to achieve the required accuracy over the required range using simple and reliable equipment, the inventors conceived a method of controlling the flow rate based on the pressure drop across the nozzle 12. The pressure drop across the nozzle 12 is the difference between the pressure in the exhaust system fuel supply line 15 and the pressure in the exhaust line 30. The flow rate though the nozzle 12 depends primarily on the pressure drop across the nozzle 12. Accordingly, the flow rate can be obtained from a predetermined relationship between the flow rate and the pressure drop across the nozzle 12.

The inventors recognized that the pressure in the exhaust system fuel supply line 15 is the primary determinant of pressure drop across the nozzle 30. In one embodiment, the pressure in the exhaust line 30 is treated as a constant, in which case flow rate though the nozzle 12 can be obtained from a predetermined relationship involving the pressure in the exhaust system fuel supply line 15 as the only measured pressure. A typical pressure variation for the exhaust line 30 is ±0.2 atm or less. If the check valve of the nozzle 12 requires a pressure drop of at least about 2.0 atm to open, then the uncertainty in the pressure drop when a constant exhaust line pressure is assumed will typically be ±10% or less.

In another embodiment, the pressure in the exhaust line 30 is measured or estimated, in which case the flow rate across the nozzle 12 can be obtained from a predetermined relationship involving the difference between pressure in the exhaust system fuel supply line 15 and the pressure in the exhaust line 30.

The pressure in the exhaust line 30, when required, can be measured directly. A sensor can be configured to measure a pressure in the exhaust line 30. Alternatively, a pressure difference between the exhaust line 30 and the exhaust system fuel supply line 15 can be measured with a device connected to both lines. As a further option, the pressure drop can be calculated using an estimate of the exhaust line pressure. The exhaust line pressure can be estimated based on the operating state of the power generation system 110. For example, the pressure can be estimated based on the amount of soot accumulated in the DPF 116, which can in turn be based on an estimate of the amount of soot produced by the engine 111 since the last regeneration of the DPF 116.

The largest variations in exhaust line pressure occur when the DPF 116 is designed for intermittent regeneration and is configured downstream from the fuel injection point. As the DPF 116 accumulates soot, the pressure drop across the DPF 116 and the pressure upstream from the DPF 116 increase. In such a case, the pressure upstream of the DPF 116 or the pressure drop across the DPF 116 is generally measured in order to determine when to regenerate the DPF 116. Thus, in exhaust lines with the largest pressure variations, the exhaust line pressure is generally readily available for calculating the pressure drop across the nozzle 12. In exhaust lines with smaller pressure variations, the pressure drop across the nozzle 12 can be estimated with sufficient accuracy from the pressure in the exhaust system fuel supply line 15 alone.

At the beginning of a fuel injection, the flow regulating valve 11 can be set to a first duty cycle or position based on feed forward control. In one example, feed forward control is based on an estimated or measured value for the pressure of the fuel supply for the valve 11. Based on a predetermined relationship, a duty cycle or degree of opening can be set in order to cause the flow rate to approach a desired flow rate.

In one embodiment, an integration is carried out using the pressure information and a relationship between that information and flow rate in order to calculate a cumulative fuel injection amount. The pressure information can pertain to either the pressure in the exhaust system fuel supply line 15 or the pressure drop across the nozzle 12.

The cumulative fuel injection amount can be used in control methods. In one example, a period of fuel injection is terminated when the cumulative fuel injection amount reaches a target value, indicating that a certain dose of fuel has been provided. In another example, one or more parameters of fuel pulsation are adjusted based on the calculated amount. Parameters of fuel pulsation include pulse width, pulse frequency, and pulse amplitude. The adjustment can be used to control the amount of fuel injected per pulse and/or the amount of fuel injected per unit time.

In another embodiment, the pressure information and relationship with flow rate is used to adjust the flow regulating valve 11 to achieve a desired flow rate in a feedback control loop. The set point and error for the control loop can be expressed in terms of pressure in the exhaust system fuel supply line 30, pressure drop across the nozzle 12, or flow rate through the nozzle 12. If the error is expressed in terms of pressure or pressure drop, then a set point is determined from a target flow rate and a predetermined relationship between the flow rate and the pressure or the pressure drop. If the error is expressed in terms of flow rate, then the predetermined relationship is used to obtain the flow rate from the pressure or pressure drop. The flow rate thus obtained is compared to the target flow rate to calculate the error. Any suitable control algorithm can be used. Examples of potentially suitable control algorithms include proportional, proportional-integral, proportional-integral-differential control, and state based control schemes.

While a typical sampling frequency for a pressure measuring device is 1000 Hz, in one embodiment the controller is operated at 40 Hz. At 40 Hz, the control algorithm tends to cause noticeable oscillations in the pressure of the exhaust system fuel supply line 15. Nevertheless, the inventors have found that the fuel injection system can be operated satisfactorily in spite of these oscillations. The oscillations can be mitigated by smoothing the pressure data, or by using a moving time average. A moving time average involves averaging a series of measurements obtained in a preceding time period. An average can be a simple average or a weighted average. Operating at 40 Hz has the advantage of allowing the controller to be integrated into a standard engine control unit (ECU). A standard ECU has a clock speed of 25 ms.

The pressure within the exhaust system fuel supply line 15 is measured by a pressure sensor 13. This sensor may be conveniently integrated with the flow regulating valve 11. The data from this sensor may be processed in several ways before being used in a control algorithm. For example, the data may be normalized, conditioned, and/or filtered. In particular, filtering may be used to remove high frequency oscillation in the pressure data. High frequency oscillations are often present in the data when the nozzle 12 comprises a check valve having a spring and poppet, such as the nozzle 40. The pressure oscillations are caused by the poppet 43, which typically oscillates on the spring 44 whenever there is flow through the valve body 45. These oscillations cause small variations in the pressure within the exhaust system fuel supply line 15, which can be detected.

In one embodiment, the flow regulating valve 11 is a pulse width modulated valve operated at a relatively low frequency. A low frequency could be 20 hertz, more typically 10 hertz or less. At such a low frequency, the pressure in the exhaust system fuel supply line 15 varies significantly with the pulsations of the valve 11. In such a case, am average or integration over a series of pressure measurements can be used in place of instantaneous values in the control algorithm. For example, an average pressure can be obtained by summing over the previous n pressure measurements and dividing by n.

In another embodiment, the pulse width modulate valve is operated at a relatively high frequency to mitigate pressure variations in the exhaust system fuel supply line 15 that could affect feedback control based on this pressure. A relatively high frequency would be about 40 hertz, more typically about 50 hertz or higher.

Figure 15:
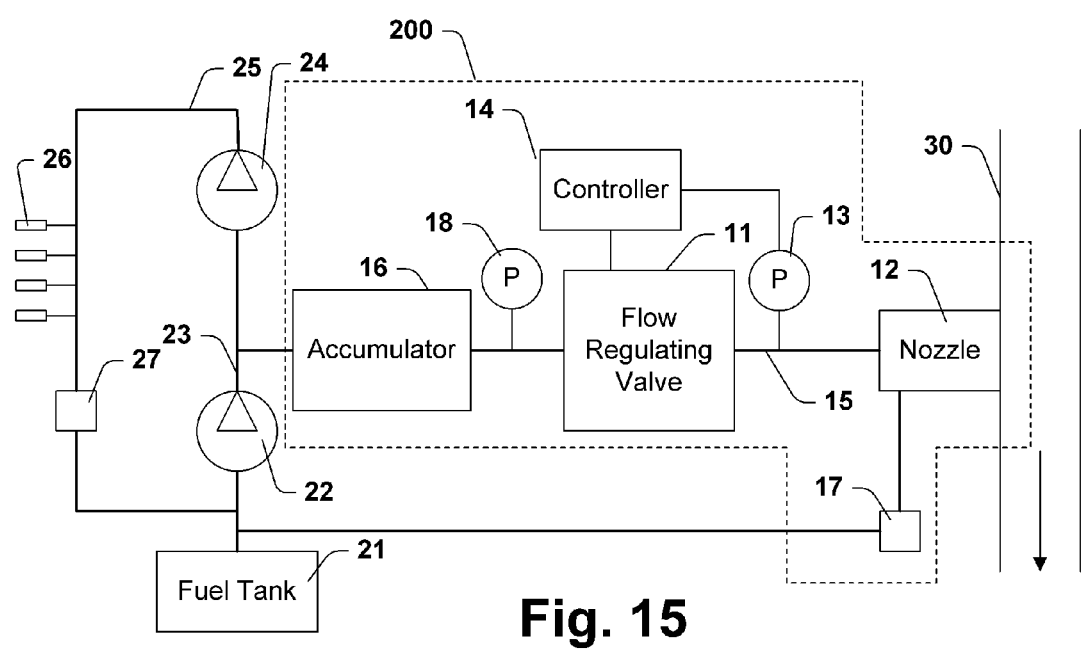
FIG. 15 is a schematic illustration of an exemplary exhaust line hydrocarbon injection system.

FIG. 15 is a schematic illustration of another exemplary exhaust line hydrocarbon injection system 200 conceived by the inventors. The exhaust line hydrocarbon injection system 200 contains many of the same components as the hydrocarbon injection system 10, but also contains a pressure accumulator 16. The pressure accumulator 16 smoothes pressure variation in the supply pressure to the flow regulating valve 11 and thus reduces perturbations affecting the flow rate. The accumulator 16 can be as simple as a length of pipe with a diameter significantly larger than that of the surrounding pipe. The hydrocarbon injection system 200 also comprises a pressure sensor 18 upstream from the flow regulating 11. This pressure sensor can be used for fault diagnostics and to provide open loop control in the event that closed loop control of the flow regulating 11 cease to function correctly.

The hydrocarbon injection system 200 comprises a nozzle 12 configured for cooling with an excess fuel flow. Check valve 17 is provided to control the flow of fuel used for cooling. The nozzle 50 can be used as the nozzle 12 with the check valve 51 in place of the check valve 17.

The exhaust line hydrocarbon injection systems disclosed herein preferably includes some form of fault detection. Exhaust system components are operated over long periods of time under conditions that may cause failure in the best designed systems. A failure in a hydrocarbon fuel injection system can have significant consequences. An over injection of fuel can cause overheating of and damage to expensive exhaust system components. Under injection can cause under performance of pollution control devices. If the reformer 114 is designed for auto-thermal operation, under injection can cause over heating by reducing the extent of endothermic steam reforming reactions while the rate of exothermic combustion reactions remains essentially constant.

Severe faults in the fuel injection system can be detected by conventional methods. For example, a leak can be detected by a rapid fall of the pressure in the exhaust system fuel supply line 15 after the end of a fuel injection, provided the fuel is not used to cool the nozzle 12 between injections. When the flow regulating valve 11 comprises a solenoid, the proper functioning of that solenoid can be determined by electrical means, such as by measuring the current to the solenoid or by measuring a current induced by the solenoid motion. Various techniques are available for determining whether the solenoid is functioning as commanded from this type of information.

More difficult to detect types of faults include partial clogging and sticking of the nozzle 12. In one embodiment, fault detection is accomplished by comparing a flow rate determined from the pressure drop across the nozzle 12, or from the pressure in the exhaust system fuel supply line 15, to a flow rate determined from a different source. An example of a different source that can be used to determine the flow rate is the pressure drop across the flow regulating valve 11 or the pressure upstream from the valve 11 in combination with the duty cycle of the valve 11, when the valve 11 is a PWM valve. Another example of a different source is a flow meter. A significant discrepancy between two flow rates determined from different sources indicates a fault. The discrepancy can be signaled and/or used to trigger a fault correction procedure.

A temperature reading in the exhaust line 30 can be used to determine a flow rate using a thermal model. For example, a thermal model can be used to predict the temperature of the fuel reformer 115 as a function of the flow rate. The model can take into account the fuel injection rate, the exhaust conditions, and the properties of the reformer 115. If the result of applying the thermal model is inconsistent with a temperature measured by the temperature measuring device 114, a difference between the actual fuel injection rate and the fuel injection rate used as an input to the model can be inferred.

Figure 16:
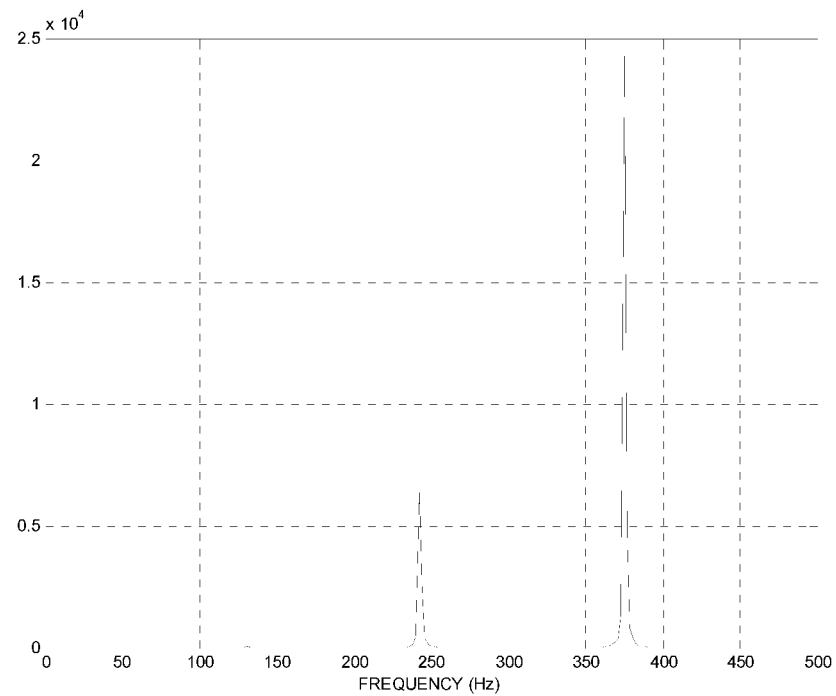
FIG. 16 is a plot showing a frequency spectrum of a series of exhaust system fuel supply line pressure measurements taken with an unclogged nozzle and a PWM flow control valve at 100% duty cycle (continuously open).
Figure 17:
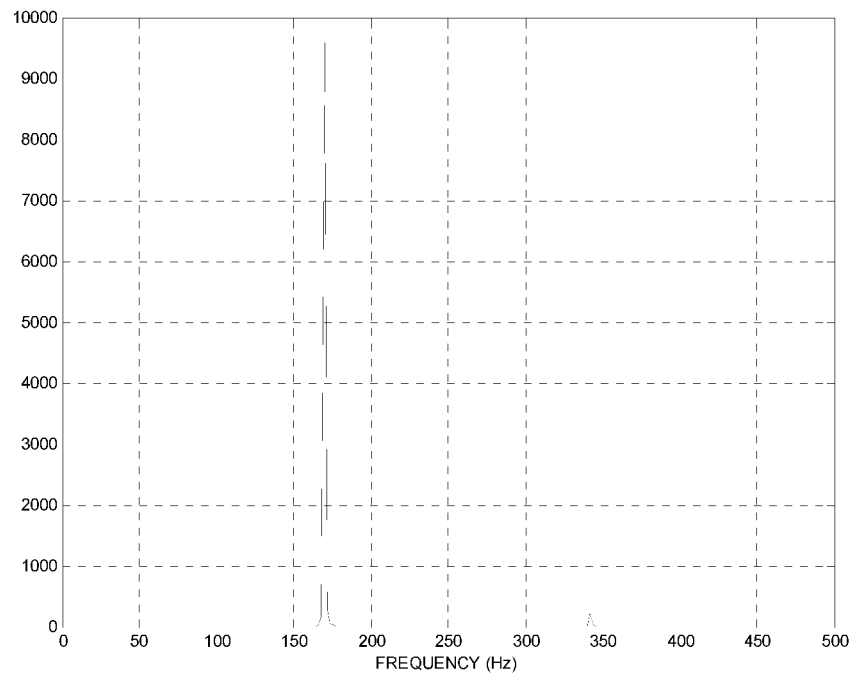
FIG. 17 is a plot showing a frequency spectrum of a series of exhaust system fuel supply line pressure measurements taken for the same system and under the same conditions as used to obtain the measurements plotted in FIG. 16, except that the nozzle is artificially partially clogged.

Another of the inventors' concepts is to detect faults through the frequency spectrum of the pressure in the exhaust system fuel supply line 15. FIGS. 16 and 17 are plots of exemplary frequency spectra obtained using a fully open flow control valve 11 and a 43 psi supply pressure. FIG. 16 is the base case, and shows a large peak at 380 Hz and a comparatively small peak at 245 Hz. FIG. 17 was obtained by simulating a partial obstruction of the nozzle. With the obstruction present, the spectrum is greatly altered, with a single peak at about 170 Hz. While the exact locations of these peaks are expected to depend on many particulars of the system used in this experiment, differences like this can be expected in most systems. If in some particular system variations in these frequency spectra are not observed as the nozzle 12 clogs, it is suggested that a different nozzle be used, preferably one in which the size of the opening between the poppet and the seat varies continuously with flow rate through the nozzle.

In one embodiment, sticking of the nozzle 12 is determined from the pressure in the exhaust system fuel supply line 15. For example, oscillations of a poppet 43 in the nozzle 40 can cause measurable high frequency oscillation in the pressure. These oscillations begin when the poppet 43 lifts off its seat 41 and cease when the poppet 43 returns to rest on its seat 41. If the pressure at which these oscillations begin is significantly higher than the pressure at which these oscillations end, sticking can be inferred.

Fault detection based on frequency spectra may be enhanced by the use of a proportional control valve for the flow regulating valve 18. The use of a proportional control valve eliminates pressure fluctuations caused by a PWM valve and thus increases the signal to noise ratio in the frequency spectra.

Detection of a fault can trigger any suitable response. Examples of suitable responses include altering a driver by illuminating a light, recording a fault code in an electronic method, and initiating a fault correction procedure. A fault correction procedure could include disabling feedback control until the fault is cleared.

In one embodiment, upon detection of a fault in feedback control of the flow regulating valve 11, the power generation system 1 switches from feedback to open loop (feed forward) control. Preferably, feed forward control involves a pressure measurement upstream from the flow regulating valve 11. The duty cycle can be set based on a predetermined relationship between the duty cycle of the flow regulating valve 11 and the flow rate through the valve, the relationship being a function of the pressure.

Advantages of configuring the system 1 for feed forward control based on a pressure measured upstream from the flow regulating valve 11 include the possibility of operating in the event of failure of the device measuring pressure in the exhaust system fuel supply line 15 and the possibility of using the upstream and downstream pressure indication to detect faults through. A flow rate determined using the upstream pressure reading can be compared to a flow rate estimated without that reading in order to detect faults.

While the engine 111 is preferably a compression ignition diesel engine, the various concepts of the inventors are applicable to power generation systems with lean-burn gasoline engines or any other type of engine that produces an oxygen rich, NOx-containing exhaust. For purposes of the present disclosure, NOx consists of NO and $NO_2$.

The power generation system 110 can have any suitable type of transmission. A transmission can be a conventional transmission such as a counter-shaft type mechanical transmission, but is preferably a CVT. A CVT can provide a much larger selection of operating points than can a conventional transmission and generally also provides a broader range of torque multipliers. The range of available operating points can be used to control the exhaust conditions, such as the oxygen flow rate and the exhaust hydrocarbon content. A given power demand can be met by a range of torque multiplier-engine speed combinations. A point in this range that gives acceptable engine performance while best meeting a control objective, such as minimum oxygen flow rate, can be selected. In general, a CVT prevents or minimizes power interruptions during shifting.

Examples of CVT systems include hydrostatic transmissions, rolling contact traction drives, overrunning clutch designs, electrics, multispeed gear boxes with slipping clutches, and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. These advantages an be achieved using a step-down gear set to reduce the torque passing through the CVT. Torque from the CVT passes through a step-up gear set that restores the torque. The CVT is further protected by splitting the torque from the engine and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel reformer 115 is a device that converts heavier fuels into lighter compounds without fully combusting the fuel. The fuel reformer 115 can be a catalytic reformer or a plasma reformer. Preferably, the fuel reformer 115 is a partial oxidation catalytic reformer comprising a steam reforming catalyst. Examples of reformer catalysts include precious metals, such as Pt, Pd, and Rh, and oxides of Al, Mg, and Ni, the latter group being typically combined with one or more of CaO, $K_2O$, and a rare earth metal such as Ce to increase activity. The fuel reformer 115 is preferably small compared to an oxidation catalyst that is designed to perform its primary functions at temperatures below 450° C. The reformer 115 is generally operative at temperatures within the range of about 450 to about 1100° C.

The LNT 117 can comprise any suitable NOx-adsorbing material. Examples of NOx adsorbing materials include, without limitation, oxides, carbonates, and hydroxides of alkaline earth metals such as Mg, Ca, Sr, and Ba or alkali metals such as K or Cs. Generally, the NOx-adsorbing material is an alkaline earth oxide. The adsorbent is typically combined with a binder and either formed into a self-supporting structure or applied as a coating over an inert substrate.

The LNT 117 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide adsorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust system must be reasonably resistant to degradation under the vibrations encountered during vehicle operation.

The ammonia-SCR catalyst 118 is functional to catalyze reactions between NOx and $NH_3$ to reduce NOx to $N_2$ in lean exhaust. Examples of SCR catalysts include some oxides of metals such as Cu, Zn, V, Cr, Al, Ti, Mn, Co, Fe, Ni, Pd, Pt, Rh, Mo, W, and Ce, and some zeolites, such as ZSM-5 or ZSM-11, substituted with metal ions such as cations of Cu, Co, Ag, Zn, or Pt. Preferably, the ammonia-SCR catalyst 118 is designed to tolerate temperatures required to desulfate the LNT 117.

Although not illustrated in any of the figures, a clean-up catalyst can be placed downstream from the other aftertreatment device. A clean-up catalyst is preferably functional to oxidize unburned hydrocarbons from the engine 111, unused reductants, and any $H_2S$ released from the LNT 117 and not oxidized by the ammonia-SCR catalyst 118. Any suitable oxidation catalyst can be used. To allow the clean-up catalyst to function under rich conditions, the catalyst may include an oxygen-storing component, such as ceria. Removal of $H_2S$, when required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of providing fuel to an exhaust aftertreatment system, comprising:
    passing the fuel through a regulating valve comprising an inlet and an outlet, the inlet being connected to a first fuel line, the outlet being connected to an exhaust system fuel supply line that communicates with a nozzle;
    injecting the fuel from the exhaust system fuel supply line into an exhaust line through the nozzle;
    obtaining pressure measurements that indicate the exhaust system fuel supply line pressure or a difference between the exhaust system fuel supply line pressure and a pressure of the exhaust line;
    providing a predetermined relationship that gives the variation of flow rate through the nozzle as a function of the pressure or pressure differential
    providing a target flow rate; and
    using the predetermined relationship and the pressure measurements to control the operation of the regulating valve with the pressure measurements providing feedback, the control causing the measured pressure to vary according to the target flow rate and approach whichever pressure the predetermined relationship indicates the flow rate is at the target flow rate.

2. The method of claim 1, wherein the first fuel line is in fluid communication with the outlet of a low pressure fuel pump and the inlet of a high pressure fuel pump that supplies an engine.

3. The method of claim 2, wherein the inlet portion of the regulating valve is connected to the fuel supply line through an accumulator, which significantly smoothes fluctuation in the fuel pressure.

4. The method of claim 1, wherein the regulating valve is a pulse width modulated valve.

5. The method of claim 4, wherein the pulse width modulated valve is operated at a frequency of about 50 Hz or greater.

6. The method of claim 1, further comprising averaging or integrating over a series of pressure measurements or flow rates in controlling the flow regulating valve.

7. The method of claim 6, wherein the pulse width modulated valve is operated at a frequency of about 10 Hz or less.

8. The method of claim 1, further comprising:
    cooling the nozzle with a fuel flow limited by a check valve, with the fuel flow coming from the exhaust system fuel supply line, and returning to a fuel reservoir;
    whereby fuel returning to the fuel reservoir cools at least a portion of the nozzle between fuel injections.

9. The method of claim 1, further comprising processing the fuel through at least one of a fuel reformer and a diesel oxidation catalyst within the exhaust line.

10. The method of claim 1, wherein the fuel is only provided intermittently to the exhaust line and is used to regenerate either a lean NOx trap or a diesel particulate filter.

11. The method of claim 1, wherein the regulating valve is a proportional flow control valve.

12. The method of claim 11, wherein the proportional control valve comprises a spool valve designed to be biased in one direction by a force in proportion to the pressure in the fuel supply line and to be biased in an opposite direction by a force applied by a actuator.

13. The method of claim 1, wherein the nozzle comprises flow regulating means consisting essentially of an orifice and a check-valve.

14. The method of claim 13, further comprising:
    obtaining an indication of a frequency spectrum of the exhaust system fuel supply line pressure;
    analyzing the frequency spectrum to perform a diagnostic of a fuel injection portion of the exhaust aftertreatment system.

15. The method of claim 1, further comprising:
    detecting a fault affecting control of the flow regulating valve based on feedback from the flow rate obtained from the relating step;
    in response to the fault detection, controlling the flow regulating valve in an open loop fashion based on a pressure measured upstream from the flow regulating valve.

16. The method of claim 1, wherein the predetermined relationship is between the indication of the exhaust system fuel supply line pressure and the flow rate through the nozzle.

17. The method of claim 1, wherein no exhaust line pressure is measured.

18. The method of claim 1, further comprising calculating a total flow through the nozzle over an injection period using the predetermined relationship, and the fuel supply line pressure.

19. The method of claim 18, further comprising terminating a period of fuel dosing after the total flow reaches a certain amount.

20. The method of claim 18, further comprising modifying a parameter for a subsequent period of fuel injection based on the total flow.

21. A power generation system, comprising:
    an engine operative to produce an exhaust that is channeled through an exhaust line;
    a fuel pump operative to pump fuel from a fuel tank to a conduit;
    a flow regulating valve configured to selectively admit fuel from the conduit and to release the fuel to an exhaust system fuel supply line;
    a nozzle configured to admit fuel from the exhaust system fuel supply line to the exhaust line;
    a pressure measuring device configured to obtain a pressure measurement from the exhaust system fuel supply line; and
    a controller provided with a predetermined relationship that gives the variation of flow rate through the nozzle as a function of the measured pressure;

wherein the controller is configured to operate the flow regulating valve to achieve a target flow rate using the predetermined relationship and the pressure measurements in such a way as to cause the measured pressure to vary according to the target flow rate and approach whichever pressure the predetermined relationship indicates the flow rate is at the target flow rate.

22. The system of claim 21, wherein the fuel pump supplies fuel to the engine.

23. The system of claim 22, further comprising an accumulator configured between the conduit and the flow regulating valve and functional to ameliorate pressure fluctuations in the fuel entering the flow regulating valve.

24. The system of claim 21, wherein the flow regulating valve is a pulse width modulated valve.

25. The system of claim 24, wherein the pulse width modulated valve is configured to operate at a frequency of about 50 Hz or more.

26. The system of claim 24, wherein the pulse width modulated valve is configured to operate at a frequency of about 10 Hz or less.

27. The system of claim 24, wherein the controller is configured to use a pressure or a flow rate that is averaged or integrated over a series of the pressure measurements in controlling the flow regulating valve.

28. The system of claim 21, further comprising a valve that allows fuel from the exhaust system fuel supply line to return to the fuel tank via a flow path configured to cool the nozzle.

29. The system of claim 21, further comprising:
a fuel reformer configured or a diesel oxidation catalyst within the exhaust line;
wherein the nozzle is configured to inject the fuel into the exhaust line upstream from the fuel reformer or the diesel oxidation catalyst.

30. The system of claim 21, further comprising:
a lean NOx trap or a diesel particulate filter configured within the exhaust line;
wherein the controller is configured to initiate fuel flow through the nozzle intermittently to regenerate the lean NOx trap or a diesel particulate filter.

31. The system of claim 21, wherein the regulating valve is a proportional flow control valve.

32. The system of claim 21, wherein the nozzle comprises flow regulating means consisting essentially of an orifice and a check-valve.

33. The system of claim 32, wherein:
the controller is configured to obtain a frequency spectrum of the exhaust system fuel supply line pressure and to analyze the frequency spectrum to check for an exhaust line fuel injection system fault.

34. The system of claim 21, further comprising a diesel particulate filter configured in the exhaust line and a second pressure measuring device configured to obtain a measurement of the pressure of the exhaust line.

35. A method of providing fuel to an exhaust aftertreatment system, comprising:
passing the fuel through a regulating valve comprising an inlet and an outlet, the inlet being connected to a first fuel line, the outlet being connected to an exhaust system fuel supply line;
passing the fuel from the exhaust system fuel supply line to an exhaust line through a nozzle;
obtaining an indication of a pressure difference between the exhaust system fuel supply line and the exhaust line;
providing a predetermined relationship between the pressure difference and a flow rate through the nozzle, the predetermined relationship giving the variation of the flow rate with the pressure difference; and
controlling the flow rate through the nozzle using the regulating valve, the predetermined relationship, and feedback from the indication of the pressure difference, the control varying the flow rate by varying the pressure difference.

* * * * *